United States Patent
Hubauer et al.

(10) Patent No.: US 9,321,202 B2
(45) Date of Patent: Apr. 26, 2016

(54) METHOD AND DEVICE FOR PRODUCING A MOLDED PART WITH A FIBER-REINFORCED SUPPORT AND FUNCTIONAL PARTS

(75) Inventors: Franz Hubauer, Leberskirchen (DE); Astrid Jünger, Stephanskirchen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 0 days.

(21) Appl. No.: 14/003,948

(22) PCT Filed: Mar. 12, 2012

(86) PCT No.: PCT/EP2012/054240
§ 371 (c)(1),
(2), (4) Date: Nov. 25, 2013

(87) PCT Pub. No.: WO2012/120146
PCT Pub. Date: Sep. 13, 2012

(65) Prior Publication Data
US 2014/0084509 A1    Mar. 27, 2014

(30) Foreign Application Priority Data
Mar. 10, 2011  (DE) .................. 10 2011 005 350

(51) Int. Cl.
*B29C 45/00* (2006.01)
*B29C 45/14* (2006.01)
(Continued)

(52) U.S. Cl.
CPC ............. *B29C 45/1418* (2013.01); *B29C 43/18* (2013.01); *B29C 43/36* (2013.01);
(Continued)

(58) Field of Classification Search
None
See application file for complete search history.

(56) References Cited

U.S. PATENT DOCUMENTS

| 2,415,961 A | 2/1947 | Nast |
| 4,842,571 A | 6/1989 | Liebl et al. |

(Continued)

FOREIGN PATENT DOCUMENTS

| AT | 404 690 B | 1/1999 |
| CN | 201530092 U | 7/2010 |

(Continued)

OTHER PUBLICATIONS

International Search Report of PCT/EP2012/054240 dated Jun. 26, 2012, and English translation of the International Preliminary Report on Patentability (26 pages).

(Continued)

*Primary Examiner* — Jacob Thomas Minskey
(74) *Attorney, Agent, or Firm* — Finnegan, Henderson, Farabow, Garrett & Dunner LLP

(57) ABSTRACT

A device for producing a molded part with a fiber-reinforced support and an attachment part connected thereto. The support is made from a fiber-reinforced mat and the attachment part is made from a plastics material. The device includes a first tool component including a nozzle for supplying liquefied plastics material and a second tool component including a cavity for forming the attachment part. One of the first and second tool components is configured to be movable relative to the other one of the first and second tool components. The device is configured to receive the mat when the device is in an open state, and to place the mat under pressure and to compress the mat to produce the support when the device is in a closed state. The nozzle is configured to introduce the plastics material into the cavity through the mat to produce the attachment part.

11 Claims, 3 Drawing Sheets

(51) Int. Cl.
  *B29C 70/48* (2006.01)
  *B29C 43/18* (2006.01)
  *B29C 43/36* (2006.01)
  *B29C 45/04* (2006.01)
  *B29C 45/28* (2006.01)
  *B29C 43/04* (2006.01)

(52) U.S. Cl.
  CPC ........... *B29C45/14786* (2013.01); *B29C 70/48* (2013.01); *B29C 45/045* (2013.01); *B29C 45/2806* (2013.01); *B29C 2043/043* (2013.01); *B29C 2043/3676* (2013.01); *B29C 2045/0079* (2013.01); *B29C 2045/0093* (2013.01); *B29C 2045/14983* (2013.01)

(56) References Cited

U.S. PATENT DOCUMENTS

| | | | |
|---|---|---|---|
| 5,197,212 A * | 3/1993 | Vail | 37/403 |
| 5,506,029 A | 4/1996 | Hara et al. | |
| 5,707,581 A | 1/1998 | Yamazaki | |
| 5,927,778 A | 7/1999 | Uytterhaeghe et al. | |
| 7,234,929 B2 | 6/2007 | Vasapoli et al. | |
| 2004/0018265 A1* | 1/2004 | Miller et al. | 425/129.1 |
| 2006/0264556 A1* | 11/2006 | Lustiger et al. | 524/451 |
| 2007/0152380 A1 | 7/2007 | Muller et al. | |
| 2008/0241296 A1* | 10/2008 | Wang et al. | 425/130 |

FOREIGN PATENT DOCUMENTS

| | | |
|---|---|---|
| DE | 28 56 618 A1 | 11/1980 |
| DE | 36 14 533 C2 | 10/1989 |
| DE | 19546551 C1 | 1/1997 |
| DE | 69222130 T2 | 1/1998 |
| DE | 694 25 959 T2 | 2/2001 |
| DE | 199 48 664 A1 | 4/2001 |
| DE | 10 2004 054 228 A1 | 6/2006 |
| DE | 102004054228 A1 | 6/2006 |
| DE | 102007036660 A1 | 2/2009 |
| DE | 102010083751 A1 | 6/2012 |
| EP | 0 221 851 B1 | 12/1991 |
| EP | 0812674 A1 | 12/1997 |
| EP | 2 163 368 A1 | 3/2010 |
| GB | 2178996 A | 2/1987 |
| GB | 2232373 A | 12/1990 |
| WO | WO 2009/019102 A1 | 2/2009 |

OTHER PUBLICATIONS

Notification of the First Office Action issued by The State Intellectual Property Office of P.R. China, mailed on Apr. 3, 2015, in Chinese Application No. 201280012634.8 (27 pages including translation).
Li et al., "Design for Automotive Interior Parts and Manufacturing Process thereof", Machine Press, Aug. 2009, p. 202.

* cited by examiner

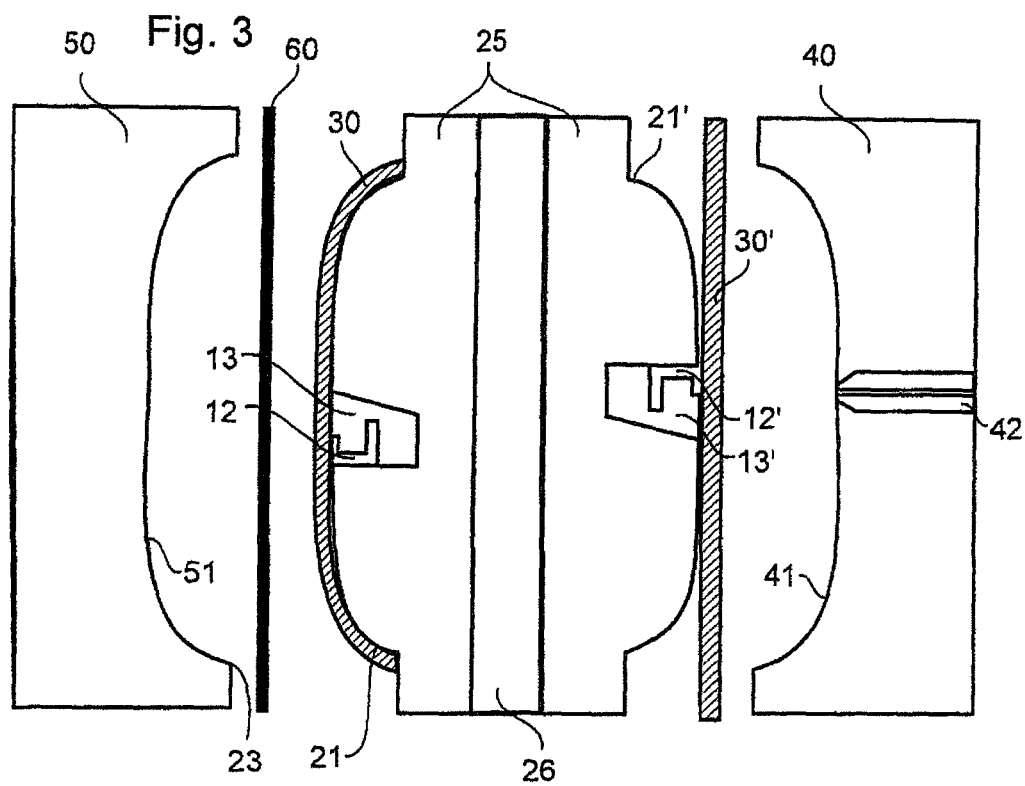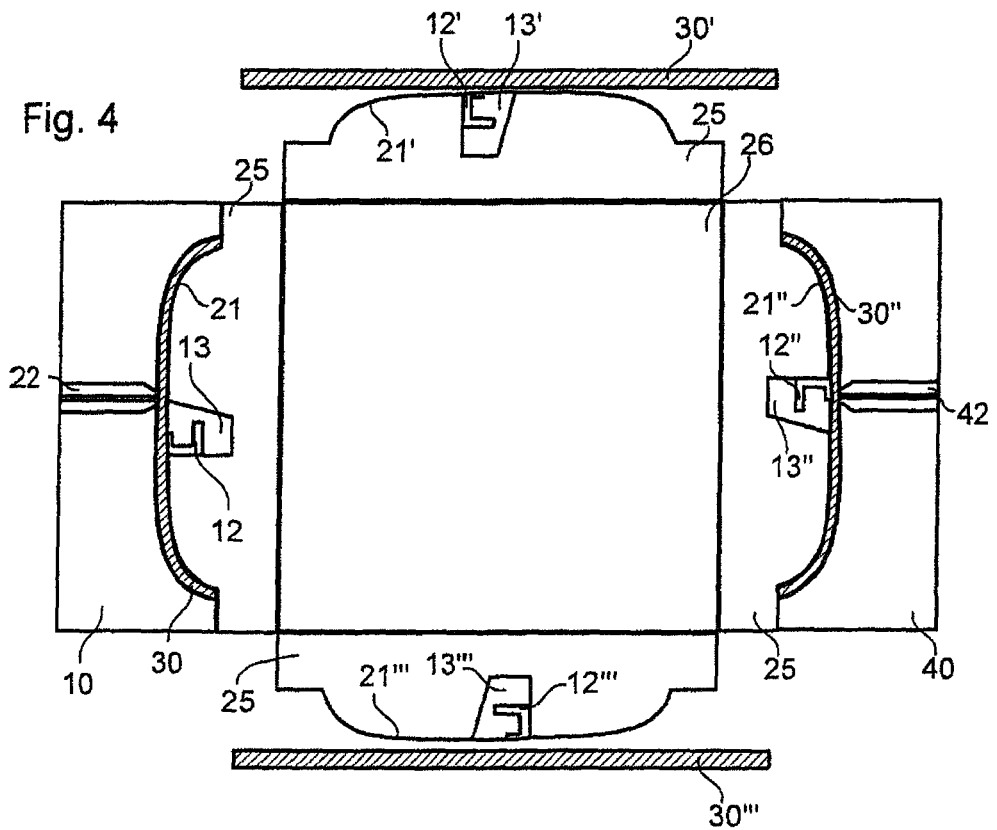

METHOD AND DEVICE FOR PRODUCING A MOLDED PART WITH A FIBER-REINFORCED SUPPORT AND FUNCTIONAL PARTS

CROSS-REFERENCE TO RELATED APPLICATIONS

This is a U.S. National Phase of PCT/EP2012/054240, filed Mar. 12, 2012, which claims the benefit of priority to German Patent Application No. 102011005350.6, filed Mar. 10, 2011, which is incorporated herein by reference.

TECHNICAL FIELD

The invention relates to a device and a method for producing a molded part with a fiber-reinforced support and at least one attachment part connected thereto and comprising plastics material, wherein the molded part is suitable, in particular, for use or further development as a decorative part in vehicle interiors.

BACKGROUND

Supports for decorative parts, for example for the interior paneling of doors, center spans of doors and side flanks for center consoles etc have previously been produced by an injection molding method or by pressing thermoplastic or thermosetting natural fiber mat systems. The connection to functional elements, for example stiffening ribs, attachment means and the like is typically effected by gluing or welding on the plastics material parts. Finally, these supports are covered with decorative items. A further production method is the direct injection of a decorative part from behind.

In the case of compressed support parts, the working steps of compressing the support mat and injecting the functional elements and connecting the functional elements to the compressed support are conventionally carried out in different working steps and different tools.

DE 10 2004 054 228 A1 discloses a method and a device for production of a molded part, wherein in a first step a blank comprising natural fiber is heated, then a molded part is produced from the blank by compressing two mold elements and then a functional part is integrally formed onto the molded part by injecting on a plastics material melt, wherein prior to this injection of the plastics material melt a cavity is formed in the molded part. These steps are carried out in a device. A comparable method and a comparable device are disclosed in DE 692 22 130 T2.

In both cases, the functional elements or plastics material parts are injected onto the natural fiber mat. An improved integration of the pressed mat and the functional parts requires further working steps and further devices.

SUMMARY

An object of the invention consists of improving the integration of a pressed fiber-reinforced support with attachment parts comprising plastics material to produce a molded part in an optimized production process.

This object is achieved with the features in accordance with the device claim 1 and the features in accordance with the method claim 11.

The tool in accordance with the invention combines the properties of a pressing and injecting tool. The production of a decorative part support, for example a support for the interior paneling of a door with a thermoplastic or thermosetting fiber-reinforced mat as a base support and attachment parts provided on the rear, such as functional elements, reinforcing elements etc, takes place in a plant.

In accordance with the invention the device for producing a molded part with a fiber-reinforced support and at least one attachment part connected thereto and comprising plastics material has at least two tool components which can move with respect to each other or wherein at least one tool component can move relative to the other. The tool components can be formed as tool halves which can be opened and closed by relative displacement. In an opened state of the tool components, a fiber-reinforced mat can be inserted which, upon closure of the tool components stamped as mold halves, impart a three-dimensional contour to the mat and compress and solidify it by means of pressure. The mat is, for this purpose, preferably a thermoplastic or thermosetting natural fiber mat. In one of the two tool components at least one nozzle is provided through which liquefied plastics material can be applied to the inserted mat in such a way that the preferably hot and pressurized melt penetrates the compressed or still uncompressed mat and reaches a cavity on the opposite side, the cavity being formed in the other tool half. The cavity corresponds to the shape of a functional element such as, for example, a reinforcing rib or a fastening part, or generally the shape of an attachment part. By means of the preferably controllable nozzle, the melt quantity and the pressure can be regulated. In comparison to the compression of the support and subsequent attachment or introduction of functional elements the number of tools, production plants and therefore production costs are reduced. In comparison to an injection molded support with functional elements the weight is reduced.

The tools in accordance with the present invention are also simplified in another respect because the one or a plurality of nozzles for the supply of the plastics material and the one or a plurality of cavities for shaping and solidifying the functional elements are not necessarily located in one tool half. In this way even very complex functional elements can be formed easily and with less complex tool halves. The fastening or integration of the functional elements with the support is clearly improved since the through-injected plastics material forms a connection with the polymer of the preferably still hot mat. Furthermore, a mechanical connection, a type of mechanical hook connection, is formed over the whole thickness of the through-injected region of the mat, which also improves the integration. No edges, unevenness or the like are formed on the surface of the decorative side. By the controlled through-going injection of the plastics material the fiber mat remains capable of being evacuated in the surrounding areas for a possible subsequent covering procedure.

The mat is preferably preheated, preferably to a temperature between 100° C. and 300° C., in particular between 180° C. and 220° C., either outside the tool or in the tool by means of an integrated heating device. In this way, the shaping of a three-dimensional contour and possibly the connection to the plastics material to be injected through is simplified. The heated mat is positioned and possibly fixed between the open tool components. The fixing can be effected by means of a tension frame, clamps or pins etc.

One tool component is preferably provided in a stationary manner, while the other tool component can be moved. In this case, the movable tool component preferably has one or a plurality of cavities and no nozzle, and the other, stationary tool component has one or a plurality of nozzles but no cavity. The provision and supply of the plastics material can be carried out more easily through the stationary tool component, while ejection of the attachment parts is favorable on the movable side.

The device preferably has at least one cutting edge on which a contour trim or trim of an aperture is effected. The cutting edge can be formed in such a way that a cut is effected thereon, for example, directly upon the tool components being pressed together, or the cutting edge can be formed in such a way that a cutting contour is imposed on the fiber mat at the cutting edge for subsequent trimming of the support.

The at least one nozzle is preferably a hot runner nozzle with a needle valve, through which nozzle the plastics material is applied to the mat by pressure. Where needle valves are used, the nozzle opening is closed by means of a needle after injection. For example, the needle can be pointed, conical or cylindrical in form. The injection residue is pressed into the plastics material part so that the surface of the attachment part is "closed" cleanly with an unobtrusive geometry. Furthermore, the melt quantity and melt pressure can be regulated by means of the individually controllable needle valves.

The needle of the nozzle preferably penetrates into the mat, whereby the through-going injection is rendered easier.

In addition to the attachment parts on the rear side, additional injection points can be used to also apply elements or coatings to the decorative side. For this purpose, each tool component preferably has at least one nozzle and at least one cavity in each case. In one specific embodiment, attachment parts are formed on the rear side and a decorative layer of plastics material is formed on the front side. In this case each of the two tool components has at least one nozzle in each case, wherein cavities are provided on the rear side which are suitable for forming attachment parts, and on the front side no cavity or one shallow cavity suitable for forming the decorative layer is provided. This can provide, for example, the plastics material lying as a decorative layer on the front surface of the mat with a grained surface structure.

In order to render the penetration of the plastics material easier, the mat can be perforated or otherwise prepared with openings and/or channels.

In one particular embodiment, one of the two tool components is disposed as a middle tool component between the other tool component and a third tool component. The middle tool component has two sides which each have at least one cavity and/or at least one nozzle. The middle tool component co-operates with the two other tool components preferably simultaneously in such a way that two mats can be compressed and provided with attachment parts simultaneously.

In a preferred embodiment, the middle tool component is provided in a stationary and/or movable manner. The two other tool components are formed in such a way that they can both move or one of the two tool components is stationary and the other of the two tool components can move.

The middle tool component is preferably formed as a movable turning unit. The turning unit can rotate relative to the two other tool components.

When a middle tool component is provided, it is possible, with this device, to carry out a one-step and a two-step method. In the case of the one-step method, on both sides of the middle tool component molded parts are preferably formed simultaneously in accordance with the method described above without a third tool component. The output of the device is therefore doubled. In this case, the middle tool component can be formed both as a stationary and/or movable tool component as well as in the form of a turning unit in order, for example, to facilitate the insertion of one or both mats to be compressed in the one tool.

In the case of the two-step method, the compression of the mat and the integration of a first attachment part or a first group of attachment parts takes place on one side of the device. For this purpose the tool is closed and the method carried out analogously to the description above. Then the tool is opened and the turning unit with the intermediate product fastened thereto is rotated so that the intermediate product is supplied to the third tool half. The tool is closed once more in order to apply or inject from behind a decorative layer and/or in order to integrate a further group of attachment parts with the mat in an injection molding process. Owing to the fact that mats are supplied to the device in such a way that upon each closure process of the device both mold cavities are provided with mats, an extension of the production cycle can be avoided even though the method has two steps.

The three tool components together form two units for compression of the mats and integration of attachment parts. At least the middle tool component and one of the two tool components are preferably provided in a movable manner, wherein the two outer tool components, therefore also the outer movable tool component, preferably each have a nozzle. In a preferred embodiment, the middle tool component is provided on both sides in each case at least with a cavity and no nozzle, wherein the other tool components have at least one nozzle and no cavity.

The injection of the plastics material, i.e. the production and integration of the attachment part, is preferably carried out following a short waiting time after closure of the tool is terminated and compression of the mat. In this way, the degree of solidification with which the integration of the attachment part is to take place can be controlled.

The plastics material preferably includes a polymer, preferably PP, ABS, PC/ABS, PA, in particular filler and/or reinforcing materials such as PP T20 can be added to the polymer.

The mat is preferably a thermoplastic or thermosetting fiber system with natural fibers, glass fibers, mineral fibers, synthetic fibers, cellulose fibers and/or carbon fibers.

BRIEF DESCRIPTION OF THE DRAWINGS

FIG. 3 shows a device for producing a molded part with three tool components in an opened state.

FIG. 4 shows a further device for producing a molded part with three tool components.

DESCRIPTION OF THE EMBODIMENTS

Figure 1A:
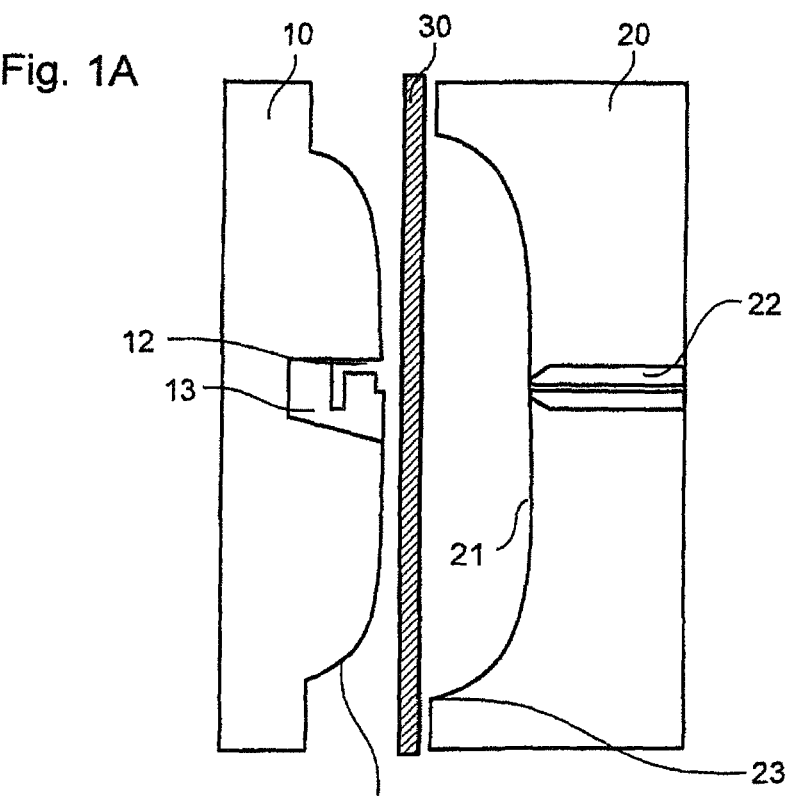
FIG. 1A schematically illustrates a device for producing a molded part with two tool components in an opened state.

FIG. 1A shows a movable tool component 10 and a stationary tool component 20. These two tool components are formed as mold elements with embossing surfaces 11 and 21 and have a shape such that upon compression of the embossing surfaces 11 and 21 a fiber mat 30 inserted between the embossing surfaces 11 and 21 adopts the form of the desired support element. FIG. 1A shows the opened state in which the fiber mat 30 is inserted.

The stationary tool component 20 has a hot runner nozzle with a needle valve 22, which is suitable for applying a hot plastics material melt against the still uncompressed or already compressed mat 30 by means of pressure. If the application is carried out against the as yet uncompressed mat 30, the tool has at least one further intermediate state in which the tool is closed but compression of the mat does not yet take place or only partially takes place.

When the device is in the closed state, a cavity 12 lies opposite the nozzle 22 so that after the needle of the valve of the nozzle opens, the hot pressurized melt penetrates the compressed mat 30 or the at least partially compressed mat 30 and reaches the opposing cavity 12. In this way, an attachment part is formed on one side of the mat 30, which is designated as the rear side. The hollow of the cavity 12 corresponds in this case to the shape of the attachment part. The cavity 12 can be provided in a replaceable or movable tool element 13 so that by simple conversion of the tool different attachment parts, and therefore different decorative element supports or decorative elements can be produced.

Figure 1B:
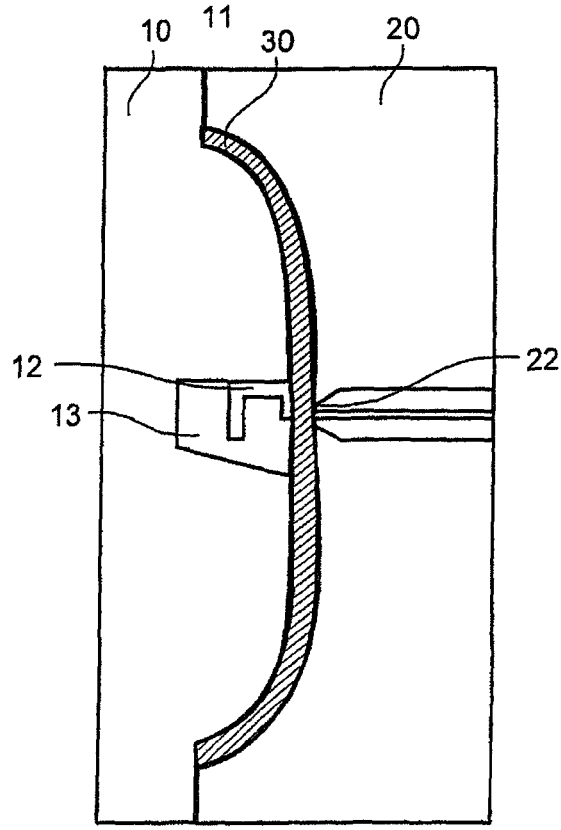
FIG. 1B shows the device of FIG. 1A in a closed state.

FIGS. 1A and 1B each only show one nozzle 22 and one cavity 12. Of course, a plurality of nozzles and a plurality of cavities can be provided. In this case, the allocation of the cavity 12 and of the nozzle 22 shown in FIGS. 1A and 1B to the movable tool half 10 or stationary tool half 20 is not binding. The provision of cavities on each of the two sides and nozzles on each of the two sides means that attachment parts or plastics material decorative layers can be provided on both sides of the fiber mat. In this case, it is feasible on the front side of the mat to form a decorative layer with plastics material injected through from the rear side or plastics material applied from the front side.

In a first manufacturing step, the mat 30 is placed between the tool components 10 and 20 and possibly fastened to one of the two tool halves 10 and 20. The temperature of the mat 30 can be increased in advance or by means of a heating device which is integrated in one or in both of the tool components 10, 20. Then the tool components 10, 20 come together and compress the mat 30 as shown in FIG. 1B.

The mat 30 is solidified by the compression and the three-dimensional contour of the support to be formed is determined. After the compressed mat 30 has cooled, a dimensionally-stable support is obtained. Furthermore, as the two tool components come together, a cutting/folding edge 23 acts upon the mat 30 so that a contour trim or even a trim of an aperture can be carried out even during this working step.

During the molding process or after the molding process is terminated, with the tool closed, a plastics material melt is introduced via the nozzle 22, penetrates the fiber mat 30 and fills the still open cavity 12. In order to facilitate the penetration of the plastics material melt, the fiber mat 30 can be perforated or holed or rendered permeable in some other way beforehand.

For example, the needle of the nozzle 22 can be driven into the mat 30 in order to shorten the penetration path or to create an aperture through the mat 30.

Upon penetration of the injected plastics material through the thermoplastic or thermosetting fiber mat system, not only is a firm connection produced based on mechanical hooking of the solidified attachment part behind the dimensionally stable support, but also a firm connection based on a connection of the respective plastics materials, since both are in a still viscous, connectable state during the production process. After the product has cooled, an excellent level of integrity between the attachment parts and the fiber-reinforced support is created.

Of course, further working steps, such as for example, cutting to size, final shaping, covering and the like, can be carried out.

Figure 2A:
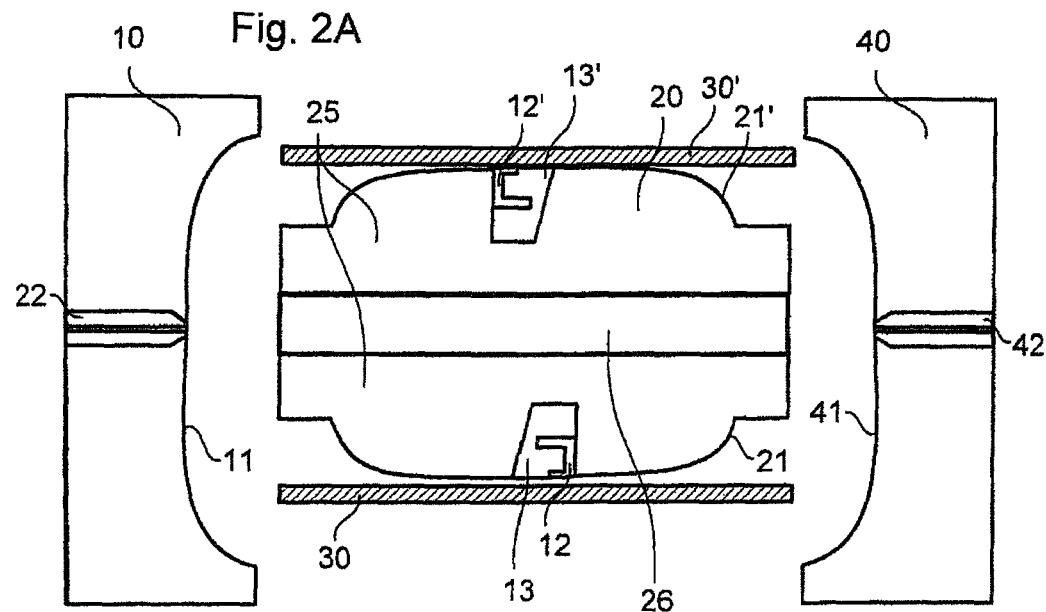
FIG. 2A shows a device for producing a molded part with three tool components in an opened insertion state.
Figure 2B:
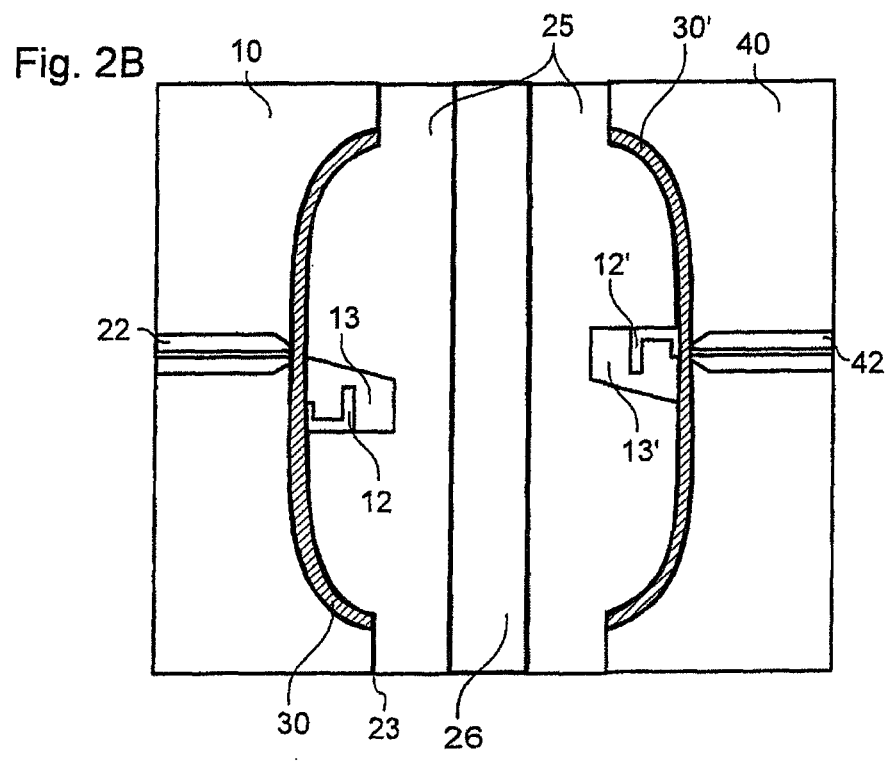
FIG. 2B shows the device of FIG. 2A in a closed state.

In another embodiment in accordance with FIGS. 2A and 2B, the tool half 20 is arranged as a turning unit 26 which has two tool sides 25 for pressing and injection. The two tool sides 25 each have an embossing surface 21 and 21' which can be provided identically or differently. The embossing surface 21 and 21' co-operate with the embossing surface 11 of the tool component 10 and with the embossing surface 41 of a third tool component 40. The turning unit 26 can rotate relative to the tool components 10 and 40.

With one arrangement of this mold, a one-step method and a two-step method can be carried out.

The one-step method is the same as the production method already described, wherein the device permits simultaneous production of two molded parts. The turning capability of the turning unit 26 simplifies the insertion of the mats. After two mats have been inserted with the device in the state shown in FIG. 2A, the turning unit rotates through 90 degrees clockwise. The embossing surfaces 21 and 21' of the tool sides 25 are now opposite the corresponding embossing surfaces 11 and 41 of the tool halves 10 and 40. By coming together, compression is effected on both sides as shown in FIG. 2B, whereby the fiber-reinforced supports are formed. At the same time, or after pressing, possibly after a short waiting time, plastics material is injected through the nozzles 22 and 42 into the corresponding cavities 12 and 12' in the tool sides 25 of the turning unit 26. After the cooling time has passed, the tool is opened and the turning unit rotates through 90 degrees clockwise or back through 90 degrees counterclockwise, whereupon the two molded parts produced can be removed.

In the two-step method, in an insertion state similar to that shown in FIG. 2A, a mat 30' is initially inserted or clamped in on one side of the turning unit 26, while on the other side a mat 30 which has already been compressed and provided with attachment parts lies against the embossing surface 21 of the turning unit 26. In the next working step, the turning unit 26 is rotated as shown in FIG. 3 so that the newly inserted mat 30' co-operates with the third tool component 40 during closure of the tool, while the second mat 30 co-operates with a first tool component 50 during closure of the tool. The newly inserted mat 30' is compressed analogously to the method shown in FIG. 1B and at least one attachment part is injected on. The already compressed mat 30 is covered with a decorative layer 60, preferably a decorative film. The embossing surface 51 of the first tool component 50 co-operates in a suitable manner with the turning unit 26 for this purpose.

In this way the mat passes through two shaping stages and/or two integration stages. A division of the working steps of compression and integration onto both sides of the device is possible. In this case, the tool component 50 or 40 and one of the two halves 25 can be free of cavities and/or nozzles.

The remaining processes of the method, compression and integration of an attachment part, proceed analogously to the above description relating to FIGS. 1A and 1B.

A modification of the embodiment with the turning unit is shown in FIG. 4 in which the working cycle is shortened by inserting the mat and compressing the mat simultaneously. To this end, the turning unit 26 has a "cube structure" in which the movable turning unit 26 has four tool sides 25 with embossing surfaces 21, 21', 21" and 21'''. The tool sides 25 are each allocated cavities 12, 12', 12" and 12''' in possibly replaceable tool elements 13, 13', 13" and 13'''. These co-operate in the manner described above with nozzles 22 and 42 of the two tool components 10 and 40.

The cube structure of the device as mentioned above can be further developed in that in addition to the tool components 10 and 40 a further two tool components are provided so that simultaneous compression and integration on four sides, or more generally on any number of sides of the cube can be carried out.

The invention claimed is:

1. A method for producing a molded part with a fiber-reinforced support and an attachment part connected to the fiber-reinforced support and comprising a plastics material, comprising:
   a) inserting a fiber-reinforced mat between a first tool component and a second tool component while the first and second tool components are in an open state, the first tool component including a nozzle for supplying liquefied plastics material and the second tool component including a cavity for forming the attachment part;
   b) closing the first and second tool components so that the fiber-reinforced mat is placed under pressure and is compressed in order to produce the fiber-reinforced support, the fiber-reinforced mat leaving the cavity un-filled; and
   c) producing and integrating the attachment part by plastics material introduced into the cavity through the nozzle and the fiber-reinforced mat, and solidified in the cavity.

2. The method of claim 1, wherein c) is carried out following a short waiting time after b) is terminated.

3. The method of claim 1, wherein the fiber-reinforced mat is preheated to a temperature between 100° C. and 300° C.

4. The method of claim 3, wherein the fiber-reinforced mat is preheated to a temperature between 180° C. and 220° C.

5. The method of claim 1, wherein the plastics material includes a polymer.

6. The method of claim 5, wherein the plastics material includes at least one of PP, ABS, PC/ABS, or PA.

7. The method of claim 5, wherein a filler or reinforcing material is added to the polymer.

8. The method of claim 7, wherein the filler or reinforcing material includes PP T20.

9. The method of claim 1, wherein the fiber-reinforced mat is a thermoplastic or thermosetting fiber system with natural fibers, glass fibers, mineral fibers, synthetic fibers, cellulose fibers, or carbon fibers.

10. The method of claim 1, wherein:
    the second tool component is formed as one of a stationary unit or a movable unit having at least one of a cavity or a nozzle, and is provided between the first tool component and a third tool component,
    the nozzle is a first nozzle,
    the cavity is a first cavity,
    the third tool component includes a second nozzle,
    the second tool component includes a second cavity,
    in the closing of b) the second tool component cooperates simultaneously with the first and third tool components so that a first fiber-reinforced mat is placed under pressure and compressed on a first side of the second tool component to produce a first fiber-reinforced support, and a second fiber-reinforced mat is placed under pressure and compressed on a second side of the second tool component to produce a second fiber-reinforced support, and
    in the producing of c) a first attachment part is produced by plastics material solidified in the first cavity after being introduced into the first cavity through the first nozzle and the first fiber-reinforced mat, and a second attachment part is produced by plastics material solidified in the second cavity after being introduced into the second cavity through the second nozzle and the second fiber-reinforced mat.

11. The method of claim 1, wherein:
    the second tool component is formed as a movable turning unit having at least one of a cavity or a nozzle, and is provided between the first tool component and a third tool component,
    the nozzle is a first nozzle,
    the cavity is a first cavity,
    the third tool component includes a second nozzle,
    the second tool component includes a second cavity,
    in the closing of b) the second tool component cooperates simultaneously with the first and third tool components so that a first fiber-reinforced mat is placed under pressure and compressed on a first side of the second tool component to produce a first fiber-reinforced support, and a second fiber-reinforced mat is placed under pressure and compressed on a second side of the second tool component to produce a second fiber-reinforced support, and
    in the producing of c) a first attachment part is produced by plastics material solidified in the first cavity after being introduced into the first cavity through the first nozzle and the first fiber-reinforced mat, and a second attachment part is produced by plastics material solidified in the second cavity after being introduced into the second cavity through the second nozzle and the second fiber-reinforced mat.

* * * * *